US006316567B1

(12) United States Patent
Kralevich, Jr. et al.

(10) Patent No.: US 6,316,567 B1
(45) Date of Patent: Nov. 13, 2001

(54) POLYMERIC RESINOUS MATERIAL DERIVED FROM LIMONENE, DICYCLOPENTADIENE, INDENE AND ALPHA-METHYL STYRENE

(75) Inventors: Mark Leslie Kralevich, Jr., Copley; Edward John Blok, Wadsworth; Lawson Gibson Wideman, Hudson; Paul Harry Sandstrom, Tallmadge, all of OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/858,693

(22) Filed: May 16, 2001

Related U.S. Application Data

(62) Division of application No. 09/377,303, filed on Aug. 18, 1999, now Pat. No. 6,265,478.

(51) Int. Cl.$^7$ .................................................. C08F 136/06
(52) U.S. Cl. .............................. 526/283; 526/76; 526/89; 526/237; 526/238; 526/290; 526/346; 525/192; 525/232
(58) Field of Search ..................................... 526/283, 237, 526/346, 76, 89, 238, 290; 525/192, 232

(56) References Cited

U.S. PATENT DOCUMENTS

| 3,466,267 | 9/1969 | Derfer ................................. 260/80.7 |
| 3,634,374 | 1/1972 | Bell ..................................... 260/87.5 |
| 3,927,144 | 12/1975 | Hayashi et al. ...................... 260/888 |
| 3,981,958 | 9/1976 | Nakashima et al. ................. 260/878 |
| 4,038,346 | 7/1977 | Feeney ................................. 260/887 |
| 4,068,062 | 1/1978 | Lepert ..................................... 526/76 |
| 4,102,834 | 7/1978 | Morimoto et al. ....................... 260/4 |
| 4,502,520 | 3/1985 | Sandstrom ............................ 152/330 |
| 4,687,794 | 8/1987 | Huddleston et al. ................. 523/351 |
| 4,739,036 | 4/1988 | Colvin et al. ......................... 528/389 |
| 4,740,559 | 4/1988 | Johansson et al. ................... 525/185 |
| 4,752,507 | 6/1988 | Johansson et al. ................ 427/385.5 |
| 4,824,921 | 4/1989 | Laviah ................................. 526/237 |
| 5,691,432 | 11/1997 | Williams ............................. 526/283 |
| 5,912,295 | 6/1999 | Oeltjen et al. ....................... 524/505 |
| 6,025,071 | 2/2000 | Cameron et al. .................... 428/355 |
| 6,133,386 | 10/2000 | Morrell et al. ....................... 526/130 |

FOREIGN PATENT DOCUMENTS

| 0990669 | 4/2000 | (EP) ............................. C08F/232/00 |
| 1029873 | 8/2000 | (EP) ............................. C08F/232/00 |
| 0011393 | 5/1980 | (EP) ............................. C08F/240/00 |
| 0249904 | 12/1987 | (EP) ............................. C08F/240/00 |
| 0063092 | 10/1982 | (EP) ............................. C08L/21/00 |
| 0318217 | 5/1989 | (EP) ................................. C09J/3/14 |

OTHER PUBLICATIONS

Chemical Abstract, vol. 90. 1979, p. 60.
Federal Register, vol. 47, No. 44, Friday, Mar. 5, 1982/Rules and Regulations at p. 9395.

*Primary Examiner*—David W. Wu
*Assistant Examiner*—Tanya Zalukaeva
(74) *Attorney, Agent, or Firm*—Bruce J. Hendricks

(57) ABSTRACT

The present application relates to polymeric resinous material comprising (1) from 5 to 70 weight percent units derived from limonene;

(2) from 5 to 70 weight percent units derived from dicyclopentadiene;

(3) from 5 to 45 weight percent units derived from indene; and (4) from 5 to 45 weight percent units derived from alpha-methyl styrene;

wherein the sum of the weight percent units derived from limonene and dicyclopentadiene range from 40 to 75 weight percent units of the resin and the sum of the weight percent units derived from indene and alpha-methyl styrene range from 25 to 60 weight percent units of the resin.

20 Claims, No Drawings

POLYMERIC RESINOUS MATERIAL DERIVED FROM LIMONENE, DICYCLOPENTADIENE, INDENE AND ALPHA-METHYL STYRENE This is a Divisional of application Ser. No. 09/377,303, filed on Aug. 18, 1999, Now U.S. Pat. No. 6,265,478B1.

BACKGROUND OF THE INVENTION

Polymeric resins have been used in treads of tires to improve traction. Unfortunately, one consequence of their use is a decrease in durability and treadwear.

Polymeric resinous materials containing units derived from piperylene, units derived from 2-methyl-2-butene and units derived from dicyclopentadiene are commercially available from The Goodyear Tire & Rubber Company under the designation WINGTACK® 115. These polymeric resinous materials find use in adhesives.

SUMMARY OF THE INVENTION

The present invention relates to a polymeric resinous material derived from limonene, dicyclopentadiene, indene and alpha-methyl styrene.

DETAILED DESCRIPTION OF THE INVENTION.

There is disclosed a polymeric resinous material comprising (a) from 5 to 70 weight percent units derived from limonene;

(b) from 5 to 70 weight percent units derived from dicyclopentadiene;

(c) from 5 to 45 weight percent units derived from indene; and (d) from 5 to 45 weight percent units derived from alpha-methyl styrene;

wherein the sum of the weight percent units derived from limonene and dicyclopentadiene range from 40 to 75 weight percent units of the resin and the sum of the weight percent units derived from indene and alpha-methyl styrene range from 25 to 60 weight percent units of the resin.

In addition, there is disclosed a rubber composition comprising (a) a diene-based elastomer containing olefinic unsaturation and (b) 1 to 80 phr of a polymeric resinous material comprising (1) from 5 to 70 weight percent units derived from limonene;

(2) from 5 to 70 weight percent units derived from dicyclopentadiene;

(3) from 5 to 45 weight percent units derived from indene; and (4) from 5 to 45 weight percent units derived from alpha-methyl styrene;

wherein the sum of the weight percent units derived from limonene and dicyclopentadiene range from 40 to 75 weight percent units of the resin and the sum of the weight percent units derived from indene and alpha-methyl styrene range from 25 to 60 weight percent units of the resin.

In addition, there is disclosed a pneumatic tire having a tread comprised of (a) a diene-based elastomer containing olefinic unsaturation and (b) 1 to 80 phr of a polymeric resinous material comprising (1) from 5 to 70 weight percent units derived from limonene;

(2) from 5 to 70 weight percent units derived from dicyclopentadiene;

(3) from 5 to 45 weight percent units derived from indene; and (4) from 5 to 45 weight percent units derived from alpha-methyl styrene;

wherein the sum of the weight percent units derived from limonene and dicyclopentadiene range from 40 to 75 weight percent units of the resin and the sum of the weight percent units derived from indene and alpha-methyl styrene range from 25 to 60 weight percent units of the resin.

The polymeric resinous material for use in the present invention comprises from about 5 to about 70 weight percent units derived from limonene; from about 5 to about 70 weight percent units derived from dicyclopentadiene; from 5 to 45 weight percent units derived from indene; and 5 to 45 weight percent units derived from alpha-methyl styrene. Preferably, the resin comprises from about 20 to about 30 weight percent units derived from limonene; from about 20 to about 30 weight percent units derived from dicyclopentadiene; from about 20 to about 30 weight percent units derived from indene; and from 20 to 30 weight percent units derived from alpha-methyl styrene.

In a particularly preferred embodiment, the weight ratio of units derived from limonene:dicyclopentadiene:indene:alpha-methyl styrene is 1:1:1:1.

The polymeric resin is particularly suited for use in a diene-based elastomer in an amount ranging from about 1 to 80 phr (parts by weight per 100 parts by weight of rubber). Preferably, the polymeric resin is present in an amount ranging from 10 to 40 phr.

The resins may be prepared using various anhydrous metallic halide catalysts. Representative examples of such catalysts are fluorides, chlorides and bromides, of aluminum, tin and boron. Such catalysts include, for example, aluminum chloride, stannic chloride and boron trifluoride. Alkyl aluminum dihalides are also suitable, representative examples of which are methyl aluminum dichloride, ethyl aluminum dichloride and isopropyl aluminum dichloride.

In carrying out the polymerization reaction, the hydrocarbon mixture is brought into contact with the anhydrous halide catalyst. Generally, the catalyst is used in particulate form having a particle size in the range of from about 5 to about 200 mesh size, although larger or smaller particles can be used. The amount of catalyst used is not critical although sufficient catalyst must be used to cause a polymerization reaction to occur. The catalyst may be added to the olefinic hydrocarbon mixture or the hydrocarbon mixture may be added to the catalyst. If desired, the catalyst and mixture of hydrocarbons can be added simultaneously or intermittently to a reactor. The reaction can be conducted continuously or by batch process techniques generally known to those skilled in the art.

The reaction is conveniently carried out in the presence of a diluent because it is usually exothermic. Various diluents which are inert in that they do not enter into the polymerization reaction may be used. Representative examples of inert diluents are aliphatic hydrocarbons such as pentane, hexane, cyclohexane and heptane, aromatic hydrocarbons such as toluene, xylene and benzene, and unreacted residual hydrocarbons from the reaction.

A wide range of temperatures can be used for the polymerization reaction. The polymerization can be carried out at temperatures in the range of from about –20° C. to about 100° C., although usually the reaction is carried out at a temperature in the range of from about 0° C. to about 50° C. The polymerization reaction pressure is not critical and may be atmospheric or above or below atmospheric pressure. Generally, a satisfactory polymerization can be conducted when the reaction is carried out at about autogenous pressure developed by the reactor under the operating conditions used. The time of the reaction is not generally critical and reaction times can vary from a few seconds to 12 hours or more.

Upon completion of the reaction the hydrocarbon mixture is neutralized followed by isolation of the resin solution. The resin solution is steam-distilled with the resulting matter resin being allowed to cool.

The resinous materials of this invention are characterized by having a softening point of from about 100° C. to about 165° C., according to ASTM Method E28, good heat stability and a specific gravity of from about 0.85 to about 1.0. They typically have a softening point of 100° C. to 165° C. after steam-stripping or vacuum-stripping to remove lower molecular weight compounds; although, when prepared in the presence of a chlorinated hydrocarbon solvent, their softening point is increased within that range. These resins are generally soluble in aliphatic hydrocarbons such as pentane, hexane, heptane and aromatic hydrocarbons such as benzene and toluene.

The tread of the tire of the present invention contains an elastomer containing olefinic unsaturation. The phrase "rubber or elastomer containing olefinic unsaturation" is intended to include both natural rubber and its various raw and reclaim forms as well as various synthetic rubbers. In the description of this invention, the terms "rubber" and "elastomer" may be used interchangeably, unless otherwise prescribed. The terms "rubber composition," "compounded rubber" and "rubber compound" are used interchangeably to refer to rubber which has been blended or mixed with various ingredients and materials and such terms are well known to those having skill in the rubber mixing or rubber compounding art. Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form NBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis-1,4-polybutadiene), polyisoprene (including cis-1,4-polyisoprene), butyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM) and, in particular, ethylene/propylene/dicyclopentadiene terpolymers. The preferred rubber or elastomers are polybutadiene and SBR.

In one aspect, the rubber is preferably of at least two of diene-based rubbers. For example, a combination of two or more rubbers is preferred such as cis 1,4-polyisoprene rubber (natural or synthetic, although natural is preferred), 3,4-polyisoprene rubber, styrene-isoprene copolymer, styrene/isoprene/butadiene rubber, emulsion and solution polymerization derived styrene/butadiene rubbers, cis 1,4-polybutadiene rubbers and emulsion polymerization prepared butadiene/acrylonitrile copolymers.

In one aspect of this invention, an emulsion polymerization derived styrene/butadiene (E-SBR) might be used having a relatively conventional styrene content of about 20 to about 28 weight percent bound styrene or, for some applications, an E-SBR having a medium to relatively high bound styrene content; namely, a bound styrene content of about 30 to about 55 percent.

The relatively high styrene content of about 30 to about 55 for the E-SBR can be considered beneficial for a purpose of enhancing traction, or skid resistance, of the tire tread. The presence of the E-SBR itself is considered beneficial for a purpose of enhancing processability of the uncured elastomer composition mixture, especially in comparison to a utilization of a solution polymerization prepared SBR (S-SBR).

By emulsion polymerization prepared E-SBR, it is meant that styrene and 1,3-butadiene are copolymerized as an aqueous emulsion. Such are well known to those skilled in such art. The bound styrene content can vary, for example, from about 5 to about 55 percent. In one aspect, the E-SBR may also contain acrylonitrile to form a terpolymer rubber, as E-SBAR, in amounts, for example, of about 2 to about 30 weight percent bound acrylonitrile in the terpolymer.

Emulsion polymerization prepared styrene/butadiene/acrylonitrile terpolymer rubbers containing about 2 to about 40 weight percent bound acrylonitrile in the terpolymer are also contemplated as diene-based rubbers for use in this invention.

The solution polymerization prepared SBR (S-SBR) typically has a bound styrene content in a range of about 5 to about 60, preferably about 10 to about 45, percent. The S-SBR can be conveniently prepared, for example, by organo lithium catalyzation in the presence of an organic hydrocarbon solvent.

A purpose of using S-SBR is for improved tire rolling resistance as a result of lower hysteresis when it is used in a tire tread composition.

The 3,4-polyisoprene rubber (3,4-PI) is considered beneficial for a purpose of enhancing the tire's traction when it is used in a tire tread composition. The 3,4-PI and use thereof is more fully described in U.S. Pat. No. 5,087,668 which is incorporated herein by reference. The Tg refers to the glass transition temperature which can conveniently be determined by a differential scanning calorimeter at a heating rate of 10° C. per minute.

The cis 1,4-polybutadiene rubber (BR) is considered to be beneficial for a purpose of enhancing the tire tread's wear, or treadwear. Such BR can be prepared, for example, by organic solution polymerization of 1,3-butadiene. The BR may be conveniently characterized, for example, by having at least a 90 percent cis 1,4-content.

The cis 1,4-polyisoprene (synthetic) and cis 1,4-polyisoprene natural rubber are well known to those having skill in the rubber art.

The term "phr" as used herein, and according to conventional practice, refers to "parts by weight of a respective material per 100 parts by weight of rubber, or elastomer."

In one embodiment, the rubber composition in the tread contains a sufficient amount of filler to contribute a reasonably high modulus and high resistance to tear. The filler may be added in amounts ranging from 10 to 250 phr. When the filler is silica, the silica is generally present in an amount ranging from 10 to 80 phr. Preferably, the silica is present in an amount ranging from 15 to 70 phr. When the filler is carbon black, the amount of carbon black will vary from 0 to 150 phr. Preferably, the amount of carbon black will range from 0 to 110 phr.

The commonly employed particulate precipitated silica used in rubber compounding applications can be used as the silica in this invention. These precipitated silicas include, for example, those obtained by the acidification of a soluble silicate; e.g., sodium silicate.

Such silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society,* Volume 60, page 304 (1930).

The silica may also be typically characterized by having a dibutylphthalate (DBP) absorption value in a range of about 100 to about 400, and more usually about 150 to about 300.

The silica might be expected to have an average ultimate particle size, for example, in the range of 0.01 to 0.05 micron as determined by the electron microscope, although the silica particles may be even smaller, or possibly larger, in size.

Various commercially available silicas may be considered for use in this invention such as, only for example herein, and without limitation, silicas commercially available from PPG Industries under the Hi-Sil trademark with designations 210, 243, etc; silicas available from Rhone-Poulenc, with, for example, designations of Z1165MP and Z165GR and silicas available from Degussa AG with, for example, designations VN2 and VN3, etc.

The processing of the sulfur vulcanizable rubber may be conducted in the presence of a sulfur containing organosilicon compound. Examples of suitable sulfur containing organosilicon compounds are of the formula:

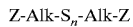
Z-Alk-S$_n$-Alk-Z    (I)

in which Z is selected from the group consisting of

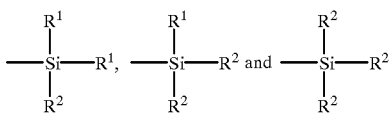

where
R$^1$ is an alkyl group of 1 to 4 carbon atoms, cyclohexyl or phenyl;
R$^2$ is alkoxy of 1 to 8 carbon atoms, or cycloalkoxy of 5 to 8 carbon atoms;
Alk is a divalent hydrocarbon of 1 to 18 carbon atoms and n is an integer of 2 to 8.

Specific examples of sulfur containing organosilicon compounds which may be used in accordance with the present invention include: 3,3'-bis (trimethoxysilylpropyl) disulfide, 3,3'-bis (triethoxysilylpropyl)tetrasulfide, 3,3'-bis (triethoxysilylpropyl)octasulfide, 3,3'-bis (trimethoxysilylpropyl)tetrasulfide, 2,2'-bis (triethoxysilylethyl)tetrasulfide, 3,3'-bis (trimethoxysilylpropyl)trisulfide, 3,3'-bis (triethoxysilylpropyl)trisulfide, 3,3'-bis (tributoxysilylpropyl)disulfide, 3,3'-bis (trimethoxysilylpropyl)hexasulfide, 3,3'-bis (trimethoxysilylpropyl)octasulfide, 3,3'-bis (trioctoxysilylpropyl)tetrasulfide, 3,3'-bis (trihexoxysilylpropyl)disulfide, 3,3'-bis (tri-2"-bis ethylhexoxysilylpropyl)trisulfide, 3,3'-bis (triisooctoxysilylpropyl)tetrasulfide, 3,3'-bis (tri-t-butoxysilylpropyl)disulfide, 2,2'-bis (methoxy diethoxy silyl ethyl)tetrasulfide, 2,2'-bis (tripropoxysilylethyl) pentasulfide, 3,3'-bis (tricyclohexoxysilypropyl)tetrasulfide, 3,3'-bis (tricyclopentoxysilylpropyl)trisulfide, 2,2'-bis (tri-2"-methylcyclohexoxysilylethyl)tetrasulifide, (trimethoxysilylmethyl)tetrasulfide, 3-methoxy ethoxy propoxysilyl 3'-diethoxybutoxy-silylpropyltetrasulfide, 2,2'-bis (dimethyl methoxysilylethyl)disulfide, 2,2'-bis(dimethyl sec.butoxysilylethyl)trisulfide, 3,3'-bis(methyl butylethoxysilylpropyl) tetrasulfide, 3,3'-bis(di t-butylmethoxysilylpropyl) tetrasulfide, 2,2'-bis(phenyl methyl methoxysilylethyl)trisulfide, 3,3'-bis (diphenyl isopropoxysilylpropyl)tetrasulfide, 3,3'-bis(diphenyl cyclohexoxysilylpropyl)disulfide, 3,3'-bis(dimethyl ethylmercaptosilylpropyl)tetrasulfide, 2,2'-bis(methyl dimethoxysilylethyl)trisulfide, 2,2'-bis(methyl ethoxypropoxysilylethyl)tetrasulfide, 3,3'-bis(diethyl methoxysilylpropyl)tetrasulfide, 3,3'-bis(ethyl di-sec. butoxysilylpropyl)disulfide, 3,3'-bis(propyl diethoxysilylpropyl)disulfide, 3,3'-bis(butyl dimethoxysilylpropyl)trisulfide, 3,3'-bis(phenyl dimethoxysilylpropyl) tetrasulfide, 3-phenyl ethoxybutoxysilyl 3'-trimethoxysilylpropyl tetrasulfide, 4,4'-bis (trimethoxysilylbutyl)tetrasulfide, 6,6'-bis (triethoxysilylhexyl)tetrasulfide, 12,12'-bis (triisopropoxysilyl dodecyl)disulfide, 18,18'-bis (trimethoxysilyloctadecyl)tetrasulfide, 18,18'-bis (tripropoxysilyloctadecenyl)tetrasulfide, 4,4'-bis (trimethoxysilyl-buten-2-yl)tetrasulfide, 4,4'-bis (trimethoxysilylcyclohexylene)tetrasulfide, 5,5'-bis (dimethoxymethylsilylpentyl)trisulfide, 3,3'-bis (trimethoxysilyl-2-methylpropyl)tetrasulfide, 3,3'-bisblis (dimethoxyphenylsilyl-2-methylpropyl)disulfide.

The preferred sulfur containing organosilicon compounds are the 3,3'-bis(trimethoxy or triethoxy silylpropyl)sulfides. The most preferred compound is 3,3'-bis (triethoxysilylpropyl)tetrasulfide. Therefore, as to Formula I, preferably Z is

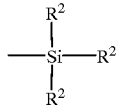

where R$^2$ is an alkoxy of 2 to 4 carbon atoms, with 2 carbon atoms being particularly preferred; Alk is a divalent hydrocarbon of 2 to 4 carbon atoms, with 3 carbon atoms being particularly preferred; and n is an integer of from 3 to 5, with 4 being particularly preferred.

The amount of the sulfur containing organosilicon compound of Formula I in a rubber composition will vary depending on the level of silica that is used. Generally speaking, the amount of the compound of Formula I, if used, will range from 0.01 to 1.0 parts by weight per part by weight of the silica. Preferably, the amount will range from 0.05 to 0.4 parts by weight per part by weight of the silica.

The rubber compositions of the present invention may contain a methylene donor and a methylene acceptor. The term "methylene donor" is intended to mean a compound capable of reacting with a methylene acceptor (such as resorcinol or its equivalent containing a present hydroxyl group) and generate the resin in-situ. Examples of methylene donors which are suitable for use in the present invention include hexamethylenetetramine, hexaethoxymethylmelamine, hexamethoxymethylmelamine, lauryloxymethylpyridinium chloride, ethoxymethylpyridinium chloride, trioxan hexamethoxymethylmelamine, the hydroxy groups of which may be esterified or partly esterified, and polymers of formaldehyde such as paraformaldehyde. In addition, the methylene donors may be N-substituted oxymethylmelamines, of the general formula:

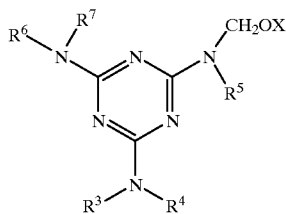

II wherein X is an alkyl having from 1 to 8 carbon atoms, $R^3$, $R^4$, $R^5$, $R^6$ and $R^7$ are individually selected from the group consisting of hydrogen, an alkyl having from 1 to 8 carbon atoms and the group —$CH_2OX$. Specific methylene donors include hexakis(methoxymethyl)melamine, N,N',N"-trimethyl/N,N',N"-trimethylolmelamine, hexamethylolmelamine, N,N',N"-dimethylolmelamine, N-methylolmelamine, N,N'-dimethylolmelamine, N,N',N"-tris(methoxymethyl)melamine and N,N'N"-tributyl-N,N', N"-trimethylol-melamine. The N-methylol derivatives of melamine are prepared by known methods.

The amount of methylene donor and methylene acceptor that is present in the rubber stock may vary. Typically, the amount of methylene donor and methylene acceptor that are present will range from about 0.1 phr to 10.0 phr. Preferably, the amount of methylene donor and methylene acceptor ranges from about 2.0 phr to 5.0 phr for each.

The weight ratio of methylene donor to the methylene acceptor may vary. Generally speaking, the weight ratio will range from about 1:10 to about 10:1. Preferably, the weight ratio ranges from about 1:3 to 3:1.

It is readily understood by those having skill in the art that the rubber composition would be compounded by methods generally known in the rubber compounding art, such as mixing the various sulfur-vulcanizable constituent rubbers with various commonly used additive materials. AS known to those skilled in the art, depending on the intended use of the sulfur vulcanizable and sulfur-vulcanized material (rubbers), the additives mentioned below are selected and commonly used in conventional amounts. Representative examples of sulfur donors include elemental sulfur (free sulfur), an amine disulfide, polymeric polysulfide and sulfur olefin adducts. Preferably, the sulfur vulcanizing agent is elemental sulfur. The sulfur vulcanizing agent may be used in an amount ranging from 0.5 to 8 phr, with a range of from 1.5 to 6 phr being preferred. Typical amounts of processing oils comprise about 1 to about 50 phr. Such processing aids can include, for example, aromatic, naphthenic and/or paraffinic processing oils. Typical amounts of antioxidants comprise about 1 to about 5 phr. Representative antioxidants may be, for example, diphenyl-p-phenylenediamine and others, such as, for example, those disclosed in the *Vanderbilt Rubber Handbook* (1978), pages 344–346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of microcrystalline and paraffinic waxes comprise about 1 to about 10 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used; i.e., primary accelerator. The primary accelerator(s) may be used in total amounts ranging from about 0.5 to about 4, preferably about 0.8 to about 2.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The mixing of the rubber composition can be accomplished by methods known to those having skill in the rubber mixing art. For example, the ingredients are typically mixed in at least two stages; namely, at least one non-productive stage followed by a productive mix stage. The final curatives including sulfur vulcanizing agents are typically mixed in the final stage which is conventionally called the "productive" mix stage in which the mixing typically occurs at a temperature, or ultimate temperature, lower than the mix temperature(s) than the preceding non-productive mix stage (s). The rubber and polymeric resin are mixed in one or more non-productive mix stages. The terms "non-productive" and "productive" mix stages are well known to those having skill in the rubber mixing art.

Vulcanization of the pneumatic tire of the present invention is generally carried out at conventional temperatures ranging from about 100° C. to 200° C. Preferably, the vulcanization is conducted at temperatures ranging from about 110° C. to 180° C. Any of the usual vulcanization processes may be used such as heating in a press or mold, heating with superheated steam or hot air or in a salt bath.

The following examples are presented in order to illustrate but not limit the present invention.

In the following examples, the Flexsys Rubber Process Analyzer (RPA) 2000 was used to determine dynamic mechanical Theological properties. The curing conditions were 160° C., 1.67 Hz, 15.8 minutes and 0.7 percent strain. A description of the RPA 2000, its capability, sample preparation, tests and subtests can be found in these references. H A Pawlowski and J S Dick, Rubber World, June 1992; J S Dick and H A Pawlowski, Rubber World, January 1997; and J S Dick and J A Pawlowski, Rubber & Plastics News, Apr. 26 and May 10, 1993.

The compounded rubber sample is placed on the bottom die. When the dies are brought together, the sample is in a pressurized cavity where it will be subjected to a sinusoidal oscillating shearing action of the bottom die. A torque transducer connected to the upper die measures the amount of torque transmitted through the sample as a result of the oscillations. Torque is translated into the shear modulus, G, by correcting for the die form factor and the strain. The RPA 2000 is capable of testing uncured or cured rubber with a high degree of repeatability and reproducibility. The tests and subtests available include frequency sweeps at constant temperature and strain, curing at constant temperature and frequency, strain sweeps at constant temperature and frequency and temperature sweeps at constant strain and frequency. The accuracy and precision of the instrument allows reproducible detection of changes in the compounded sample.

The values reported for the storage modulus, (G'), loss compliance (J") and tan delta are obtained from a strain sweep at 100° C. and 11 Hz following the cure test. These properties represent the viscoelastic response of a test sample to shear deformation at a constant temperature and frequency.

EXAMPLE 1

Three hundred parts of cyclohexane and 50 parts of anhydrous aluminum chloride were placed into a reactor. While continuously stirring the mixture, 600 parts of a hydrocarbon mixture was slowly added to the reactor over a period of about 60 minutes. The hydrocarbon mixture consisted of 30 percent inert hydrocarbons with the remaining 70 percent by weight of the mixture comprising the following resin forming components:

| Component | Percent |
|---|---|
| Limonene | 25 |
| Dicyclopentadiene | 25 |
| Indene | 25 |
| Alpha-Methyl Styrene | 25 |

The temperature of the reaction was maintained in a range of about 25° to 30° C. After an hour of agitation from the time of final addition, the hydrocarbon mixture was added to approximately 4,000 parts of a 25 percent solution of isopropyl alcohol in water to neutralize and decompose the aluminum chloride. The aqueous layer was removed and the resin solution washed with an additional 4,000 parts of the alcohol/water blend.

The resulting resin solution was steam-distilled at a pot temperature of about 235° C. The resulting residual molten resin was cooled to room temperature to form 400 parts of a hard brittle pale yellow resin having a capillary tube softening point of 124 to 151° C. Small molecule GPC analysis gives a molecular weight distribution of 3.3 percent in the 10,600 MW range, 89.5 percent in the 1550 MW range, 1.9 percent in the 330 MW range and 0.7 percent in the 240 MW range.

EXAMPLE 2

In this example, various resins were evaluated in a rubber compound.

Rubber compositions containing the materials set out in Tables 1 and 2 were prepared in a BR Banbury™ mixer using two separate stages of addition (mixing); namely, one non-productive mix stage and one productive mix stage. The non-productive stage was mixed at 55 rpm for 2.5 minutes or to a rubber temperature of 180° C., whichever occurred first. The productive stage was mixed at 35 rpm for 2.5 minutes or to a rubber temperature of 120° C., whichever occurred first.

The rubber compositions are identified herein as Samples 1–3. Samples 1 and 2 are considered herein as controls without the use of the resin used in the present invention being added to the rubber composition. Samples 1 and 2 each contain commercially available resins. Sample 3 is the resin prepared in Example 1.

The samples were cured at about 150° C. for about 28 minutes or at 160° C., 1.67 Hz for 15.8 minutes at 0.7 percent strain.

Table 2 illustrates the behavior and physical properties of the cured Samples 1–3.

This invention significantly improves durability while maintaining the dry traction of tires. Generally increasing a compound's durability reduces its dry traction. A good example of this tradeoff is shown by Examples 1 and 2 (see Table 2). Example 1 has good dry traction (high J" and tan delta values) but poor durability (low modulus, tensile strength and G' 40 percent). Example 2 has increased durability, but the dry traction is decreased.

TABLE 1

| Samples | Ctrl 1 | Ctrl 2 | 3 |
|---|---|---|---|
| Non-Productive | | | |
| Solution SBR[1] | 120 | 120 | 120 |
| Carbon Black[2] | 80.0 | 80.0 | 80.0 |
| Aromatic Oil | 12 | 12 | 12 |
| Stearic Acid | 2.0 | 2.0 | 2.0 |
| Zinc Oxide | 2.0 | 2.0 | 2.0 |
| Antioxidant[3] | 1.0 | 1.0 | 1.0 |
| Phenolic Resin[4] | 25.0 | 0 | 0 |
| Coumarone Indene[5] Resin | 0 | 25.0 | 0 |
| Resin of Example 1 | 0 | 0 | 25.0 |
| Productive | | | |
| Accelerators[6] | 3.5 | 3.5 | 3.5 |
| Accelerator[7] | 0.25 | 0.25 | 0.25 |
| Sulfur | 0.85 | 0.85 | 0.85 |

[1]Solution SBR containing 32 percent styrene, a vinyl content of 42 percent, a Tg of −16° C. and a Mooney of 85–95. The SBR was oil-extended (20.0 phr oil). The solution SBR was obtained from The Goodyear Tire & Rubber Company.
[2]$I_2$ = 122 and DBP = 114
[3]Polymerized 1,2-dihydro-2,2,4-trimethylquinoline
[4]Unreactive phenol-formaldehyde resin having a melting point of 106–114° C. (Ring and Ball) which is commercially available from Schenectady Chemical under the designation CRJ-418.
[5]Coumarone Indene Resin having a softening point of 100° C. which is commercially available from Neville Chemical under the designature Cumar ™ R-13.
[6]N-cyclohexyl benzothiazole-2-sulfenamide
[7]Tetramethyl thiuram disulfide

TABLE 2

| Sample | 1 | 2 | 3 |
|---|---|---|---|
| Phenolic resin | 25.0 | 0 | 0 |
| Coumarone Indene Resin | 0 | 25.0 | 0 |
| Resin of Example 1 | 0 | 0 | 25.0 |
| RPA 2000, 15.8 min, 160° C., 1.67 Hz, 0.7% strain | | | |
| T2 (min) | 0.62 | 0.89 | 0.39 |
| T25 (min) | 1.88 | 2.79 | 1.91 |
| T90 (min) | 7.22 | 8.66 | 9.07 |
| Min Torque (dNm) | 0.51 | 0.57 | 0.58 |

TABLE 2-continued

| Sample | 1 | 2 | 3 |
|---|---|---|---|
| Max Torque (dNm) | 2.05 | 2.55 | 3.22 |
| Delta Torque (dNm) | 1.54 | 1.98 | 2.64 |
| RPA 2000, 11 Hz, 100° C. | | | |
| G' at 40% (kPa) | 406.65 | 491.69 | 501.55 |
| Tan Delta 40% | 0.257 | 0.235 | 0.286 |
| J" at 40% 1/MPa | 0.59 | 0.45 | 0.527 |
| UTS, cure 28 minutes @ 150° C. | | | |
| 300% Modulus, MPa | 4.19 | 4.82 | 5.34 |
| Tensile Strength, MPa | 10.32 | 12.28 | 13.38 |
| Elongation, % | 565 | 600 | 585 |

The DCPD/Limonene/Indene/AMS resin in Sample 3 (present invention) imparts both a durability and dry traction advantage over the coumarone indene control (Sample 2). Modulus at 300 percent and dynamic modulus (G') at 40 percent strain are significantly increased which should provide more cornering stiffness and better handling. Tensile strength is increased which will improve the graining and blistering resistance of the tread. The loss compliance (J") and tan delta at 40 percent strain were improved which indicates improved traction. Versus the soft, high traction phenolic resin in control Sample 1, the DCPD/Limonene/Indene/AMS resin provides a substantial improvement in durability and handling as seen in the 300 percent modulus, G' at 40 percent strain, and tensile strength with equal or only slightly decreased dry traction as seen in the tan delta and J" at 40 percent strain. This resin improves the tradeoff between traction and durability that is present with conventional materials.

While certain representative embodiments and details have been shown for the purpose of illustrating the invention, it will be apparent to those skilled in this art that various changes and modifications may be made therein without departing from the spirit or scope of the invention.

What is claimed is:

1. A polymeric resinous material comprising
   (a) from 5 to 70 weight percent units derived from limonene;
   (b) from 5 to 70 weight percent units derived from dicyclopentadiene;
   (c) from 5 to 45 weight percent units derived from indene; and
   (d) from 5 to 45 weight percent units derived from alpha-methyl styrene;
   wherein the sum of the weight percent units derived from limonene and dicyclopentadiene range from 40 to 75 weight percent units of the resin and the sum of the weight percent units derived from indene and alpha-methyl styrene range from 25 to 60 weight percent units of the resin.

2. The polymeric resinous material according to claim 1 having a softening point of from about 100° C. to about 165° C.

3. The polymeric resinous material according to claim 1 comprising
   (1) from 20 to 30 weight percent units derived from limonene;
   (2) from 20 to 30 weight percent units derived from dicyclopentadiene;
   (3) from 20 to 30 weight percent units derived from indene; and
   (4) from 20 to 30 weight percent units derived from alpha-methyl styrene.

4. The polymeric resinous material according to claim 3 wherein the weight ratio of limonene:dicyclopentadiene:indene:alpha-methyl styrene is 1:1:1:1.

5. The polymeric resinous material according to claim 1 wherein the polymeric resinous material is modified by containing up to about 25 weight percent units derived from other unsaturated hydrocarbons containing from 9 to 10 carbon atoms.

6. The polymeric resinous material according to claim 5 wherein the said other unsaturated hydrocarbons containing from 9 to 10 carbon atoms are selected from 3-methyl styrene, 4-methyl styrene, 1-methyl indene, 2-methyl indene, 3-methyl indene and mixtures thereof.

7. The polymeric resinous material according to claim 1 wherein said polymeric resinous material is prepared by the method which comprises polymerizing a mixture of limonene, dicyclopentadiene, indene and alpha-methyl styrene in the presence of an anhydrous halide catalyst selected from the fluorides, chlorides and bromides of aluminum, tin and boron and from alkyl aluminum dihalides selected from methyl aluminum dichloride, ethyl aluminum dichloride and isopropyl aluminum dichloride.

8. The polymeric resinous material according to claim 7 wherein the halide catalysts are selected from aluminum chloride, stannic chloride, boron trifluoride, methyl aluminum dichloride, ethyl aluminum dichloride and isopropyl aluminum dichloride.

9. A rubber composition comprising (a) a diene-based elastomer containing olefinic unsaturation and (b) 1 to 80 phr of a polymeric resinous material comprising
   (1) from 5 to 70 weight percent units derived from limonene;
   (2) from 5 to 70 weight percent units derived from dicyclopentadiene;
   (3) from 5 to 45 weight percent units derived from indene; and
   (4) from 5 to 45 weight percent units derived from alpha-methyl styrene;
   wherein the sum of the weight percent units derived from limonene and dicyclopentadiene range from 40 to 75 weight percent units of the resin and the sum of the weight percent units derived from indene and alpha-methyl styrene range from 25 to 60 weight percent units of the resin.

10. The rubber composition according to claim 9 characterized by the polymeric resinous material having a softening point of from about 100° C. to about 160° C.

11. The rubber composition according to claim 9 wherein from 20 to 40 phr of a polymeric resinous material is present.

12. The rubber composition according to claim 9 wherein said polymeric resinous material comprises
   (1) from 20 to 30 weight percent units derived from limonene;
   (2) from 20 to 30 weight percent units derived from dicyclopentadiene;
   (3) from 20 to 30 weight percent units derived from indene; and
   (4) from 20 to 30 weight percent units derived from alpha-methyl styrene.

13. The rubber composition according to claim 12 wherein the weight ratio of limonene:dicyclopentadiene:indene:alpha-methyl styrene is 1:1:1:1.

14. The rubber composition according to claim 9 wherein the polymeric resinous material is modified by containing up to about 25 weight percent units derived from other unsaturated hydrocarbons containing from 9 to 10 carbon atoms.

15. The rubber composition according to claim 14 wherein the said other unsaturated hydrocarbons containing from 9 to 10 carbon atoms are selected from 3-methyl styrene, 4-methyl styrene, 1-methyl indene, 2-methyl indene, 3-methyl indene and mixtures thereof.

16. The rubber composition according to claim 9 wherein said polymeric resinous material is prepared by the method which comprises polymerizing a mixture of limonene, dicyclopentadiene, indene and alpha-methyl styrene in the presence of an anhydrous halide catalyst selected from the fluorides, chlorides and bromides of aluminum, tin and boron and from alkyl aluminum dihalides selected from methyl aluminum dichloride, ethyl aluminum dichloride and isopropyl aluminum dichloride.

17. The rubber composition according to claim 16 wherein the halide catalysts are selected from aluminum chloride, stannic chloride, boron trifluoride, methyl aluminum dichloride, ethyl aluminum dichloride and isopropyl aluminum dichloride.

18. The rubber composition according to claim 9 wherein said elastomer containing olefinic unsaturation is selected from the group consisting of natural rubber, neoprene, polyisoprene, polybutadiene, styrene-butadiene copolymer, styrene/isoprene/butadiene rubber, methyl methacrylate-butadiene copolymer, isoprene-styrene copolymer, methyl methacrylate-isoprene copolymer, acrylonitrile-isoprene copolymer, acrylonitrile-butadiene copolymer, EPDM and mixtures thereof.

19. The rubber composition according to claim 18 wherein said elastomer is styrene-butadiene copolymer.

20. Thr rubber composition according to claim 9 wherein a filler is present in said elastomer in an amount ranging from 10 to 250 phr.

\* \* \* \* \*

UNITED STATES PATENT AND TRADEMARK OFFICE
CERTIFICATE OF CORRECTION

PATENT NO. : 6,316,567 B1
DATED : November 13, 2001
INVENTOR(S) : Mark Leslie Kralevich, Jr. et al.

It is certified that error appears in the above-identified patent and that said Letters Patent is hereby corrected as shown below:

Column 6,
Line 36, change "3,3'-bisblis" to -- 3,3'-bis --;

Column 7,
Line 47, change "AS" to -- As --; and

Column 8,
Line 57, change "Theological" to -- rheological --

Signed and Sealed this

Nineteenth Day of March, 2002

Attest:

JAMES E. ROGAN
Director of the United States Patent and Trademark Office

Attesting Officer